(12) United States Patent
Kitano (10) Patent No.: US 10,257,419 B2
(45) Date of Patent: Apr. 9, 2019

(54) SEMICONDUCTOR DEVICE, CORRECTION METHOD IN SEMICONDUCTOR DEVICE, AND CORRECTION METHOD OF CAMERA MODULE

(71) Applicant: Renesas Electronics Corporation, Tokyo (JP)

(72) Inventor: Toru Kitano, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 16/054,664

(22) Filed: Aug. 3, 2018

(65) Prior Publication Data

US 2018/0343392 A1  Nov. 29, 2018

Related U.S. Application Data

(60) Division of application No. 15/707,845, filed on Sep. 18, 2017, which is a continuation of application No. (Continued)

(30) Foreign Application Priority Data

Feb. 19, 2015  (JP) .................................. 2015-030538

(51) Int. Cl.
*H04N 5/232* (2006.01)
*G02B 27/64* (2006.01)
(Continued)

(52) U.S. Cl.
CPC .............................. *H04N 5/23258* (2013.01)

(58) Field of Classification Search
CPC ........... H04N 5/23243; H04N 5/23258; H04N 5/23248–5/2329; H04N 5/23251;
(Continued)

(56) References Cited

U.S. PATENT DOCUMENTS 6,801,247 B1    10/2004  Ohishi
9,794,484 B2 *  10/2017  Kitano ............... H04N 5/23258
                                                       348/208.2
(Continued)

FOREIGN PATENT DOCUMENTS

JP       2014-098613 A    5/2014

OTHER PUBLICATIONS

Office Action in U.S. Appl. No. 15/707,845 dated Nov. 1, 2017.
(Continued)

*Primary Examiner* — Marly S Camargo
(74) *Attorney, Agent, or Firm* — McGinn IP Law Group, PLLC.

(57) ABSTRACT

A gyro sensor includes a first register that stores angular velocity information; a second register that stores sensitivity deviation information of the angular velocity information stored in the first register; a serial communication circuit; and a control circuit that selects the first register or the second register in accordance with designation information supplied through the serial communication circuit. When the first register is selected by the control circuit, the angular velocity information stored in the first register is output through the serial communication circuit, and when the second register is selected by the control circuit, the sensitivity deviation information stored in the second register is output through the serial communication circuit.

4 Claims, 7 Drawing Sheets

Related U.S. Application Data

14/967,060, filed on Dec. 11, 2015, now Pat. No. 9,794,484.

(51) Int. Cl.
  *G01C 19/00* (2013.01)
  *G01C 19/56* (2012.01)
  *G01P 15/00* (2006.01)

(58) Field of Classification Search
  CPC .................................. G03B 2217/005; G03B 2205/0007–2205/0038; G02B 27/646; G01C 19/00; G01C 19/56; G05B 2219/37134; G01P 15/00
  USPC ........ 348/208.2, 208.99–208.16; 396/52, 53, 396/54, 55; 359/555, 556, 557; 702/92, 702/85, 151; 73/1.77, 504.08, 504.18, 73/503.3
  See application file for complete search history.

(56) References Cited

U.S. PATENT DOCUMENTS

| | | |
|---|---|---|
| 2005/0206738 A1 | 9/2005 | Kumaki |
| 2007/0029629 A1 | 2/2007 | Yazdi |
| 2008/0115562 A1 | 5/2008 | Haino |
| 2009/0295978 A1 | 12/2009 | Yun |
| 2009/0314084 A1* | 12/2009 | Sugibayashi ...... G01C 19/5607 73/504.12 |
| 2010/0123783 A1* | 5/2010 | Lin .................... H04N 5/23258 348/108 |
| 2011/0105181 A1 | 5/2011 | Mcleod |
| 2013/0133397 A1 | 5/2013 | Kim |
| 2014/0184891 A1 | 7/2014 | Lee |
| 2014/0320678 A1* | 10/2014 | Lee .................... H04N 5/23258 348/208.1 |
| 2015/0009400 A1 | 1/2015 | Shin |
| 2016/0150157 A1 | 5/2016 | Lee |
| 2016/0248977 A1 | 8/2016 | Kitano |
| 2018/0007268 A1* | 1/2018 | Kitano ............... H04N 5/23258 438/208.2 |

OTHER PUBLICATIONS

U.S. Non-Final Office Action dated Dec. 15, 2016 in parent U.S. Appl. No. 14/967,060.

U.S. Notice of Allowance dated Jun. 19, 2017 in parent U.S. Appl. No. 14/967,060.

* cited by examiner

SEMICONDUCTOR DEVICE, CORRECTION METHOD IN SEMICONDUCTOR DEVICE, AND CORRECTION METHOD OF CAMERA MODULE

CROSS-REFERENCE TO RELATED APPLICATIONS

The present application is a Divisional application of U.S. patent application Ser. No. 15/707,845, filed on Sep. 18, 2017, which is a Continuation application of U.S. patent application Ser. No. 14/967,060, filed on Dec. 11, 2015, now U.S. Pat. No. 9,794,484 B2, issued on Oct. 17, 2017, which is based on Japanese Patent Application No. 2015-030538 filed on Feb. 19, 2015, the contents of which is incorporated herein by reference in its entirety.

BACKGROUND

The present invention relates to a semiconductor device, a correction method in a semiconductor device, and a correction method of a camera module, and particularly to a semiconductor device that processes positional information from a gyro sensor and a camera module using the gyro sensor.

A gyro sensor is a sensor to detect an angular velocity, and has been used to detect a camera shake of a video camera or the like in recent years. The gyro sensor is described in, for example, Japanese Unexamined Patent Application Publication No. 2014-98613.

SUMMARY

For example, in the case where a camera shake is detected using a gyro sensor, used is a camera module obtained by integrating a lens of a camera, an optical sensor that takes an image passing through the lens, a gyro sensor, and a semiconductor device that controls the lens or the optical sensor using positional information from the gyro sensor. In this case, the semiconductor device recognizes a positional change of the camera module due to a camera shake using the positional information output from the gyro sensor, and controls the lens or the optical sensor so as to correct the displacement and the amount of displacement of an imaging point of an image on the optical sensor caused by the camera shake. There is a lens shift system as a system of controlling a lens, and there is a sensor shift system as a system of controlling an optical sensor. Further, the lens shift system includes, for example, a lens barrel system in which a lens is moved in parallel with an optical sensor, a lens tilt system in which a lens is tilted, and the like. Further, other than the lens shift system and the sensor shift system, there is a module tilt system in which an optical image stabilizer (OIS) including a lens and an optical sensor is tilted.

Even in the case of adopting either system, a gyro sensor manufactured in a gyro sensor manufacturing process in which gyro sensors are manufactured is assembled into a camera module in a module assembly process. In this case, the sensitivity of the manufactured gyro sensor is corrected so as to fall within a predetermined range in the gyro sensor manufacturing process. The sensitivity of the gyro sensor is the value of positional information output from the gyro sensor when the angular velocity is changed by, for example, 1. The positional information is represented using, for example, a digital value. Accordingly, provided is a gyro sensor that outputs, as positional information, a digital value corrected so as to fall within a predetermined range (between a second digital value larger than a first digital value that is the center value and a third digital value smaller than the first digital value) when the angular velocity is changed by 1.

In other words, in the case of a plurality of gyro sensors, the sensitivity of each gyro sensor varies in a predetermined range due to the characteristics of each gyro sensor. Specifically, a deviation (sensitivity deviation) occurs in the sensitivity among the gyro sensors. Therefore, when a camera module is assembled using a gyro sensor, the swing suppression ratio of the camera module differs depending on each camera module. In this case, the swing suppression ratio is a ratio of the amounts of change of a captured image when a camera shake correction function is activated and inactivated. It is obvious that in the case where the swing suppression ratio is small, the amount of change becomes smaller when the camera shake correction function is activated. Thus, the swing suppression ratio is desirably small.

In order to minimize the swing suppression ratio of each camera module, it is conceivable that, for example, each of assembled camera modules is vibrated (application of vibration), and the characteristics of a semiconductor device that controls a lens or an optical sensor are set for each camera module. In this case, it is necessary to vibrate the camera module.

An object of the present invention is to provide a semiconductor device that can suppress the cost of a camera module from increasing.

The above-described and other objects and novel features of the present invention will become apparent from the description of the specification and the accompanying drawings.

The following is a summary of a representative outline of the invention disclosed in the application.

Specifically, a semiconductor device coupled to a device that outputs positional information includes a first external terminal to which the positional information is supplied, and a second external terminal. Sensitivity deviation information representing the deviation of the sensitivity of the device is received through the second external terminal, and a gain to amplify the positional information from the first external terminal is set on the basis of the sensitivity deviation information. By setting the gain to amplify the positional information on the basis of the sensitivity deviation information, even if the sensitivity differs among the devices, the gain to amplify the positional information is associated with the sensitivity of each device. Accordingly, the swing suppression ratio can be minimized without vibrating each module having the device mounted, and the cost can be suppressed from being increased.

In an embodiment, the first external terminal and the second external terminal are the same external terminals, and the positional information and the sensitivity deviation information are supplied in a time-division manner. Accordingly, the number of external terminals of the semiconductor device can be suppressed from being increased, and the cost can be further suppressed from being increased.

In the embodiment, a deviation between the sensitivity (digital value) of the device and a predetermined sensitivity (first digital value) is used as the sensitivity deviation information.

The following is a summary of effects obtained from the representative invention disclosed in the application.

It is possible to provide a semiconductor device that can suppress the cost of a camera module from increasing.

Further, it is possible to provide a semiconductor device that can reduce the number of processes.

Furthermore, it is possible to provide a semiconductor device that can reduce the number of facilities.

DETAILED DESCRIPTION

Hereinafter, embodiments of the present invention will be described in detail on the basis of the drawings. It should be noted that the same constitutional elements are given the same reference numerals in principle in the all drawings for explaining the embodiments, and the repetitive explanation thereof will be omitted in principle.

Further, an example of camera shake correction of a camera module using a gyro sensor will be described in the following embodiments. However, the present invention is not limited to the camera module.

First Embodiment

<Outline of Camera Shake Correction>

First, an outline of camera shake correction in which the displacement and displacement amount of an imaging point caused by a camera shake are corrected will be described. There are various methods of camera shake correction as described above. In the specification, camera shake correction adopting a lens shift system will be described. It is obvious that the present invention is not limited to the lens shift system, but various systems can be adopted.

Figure 6:
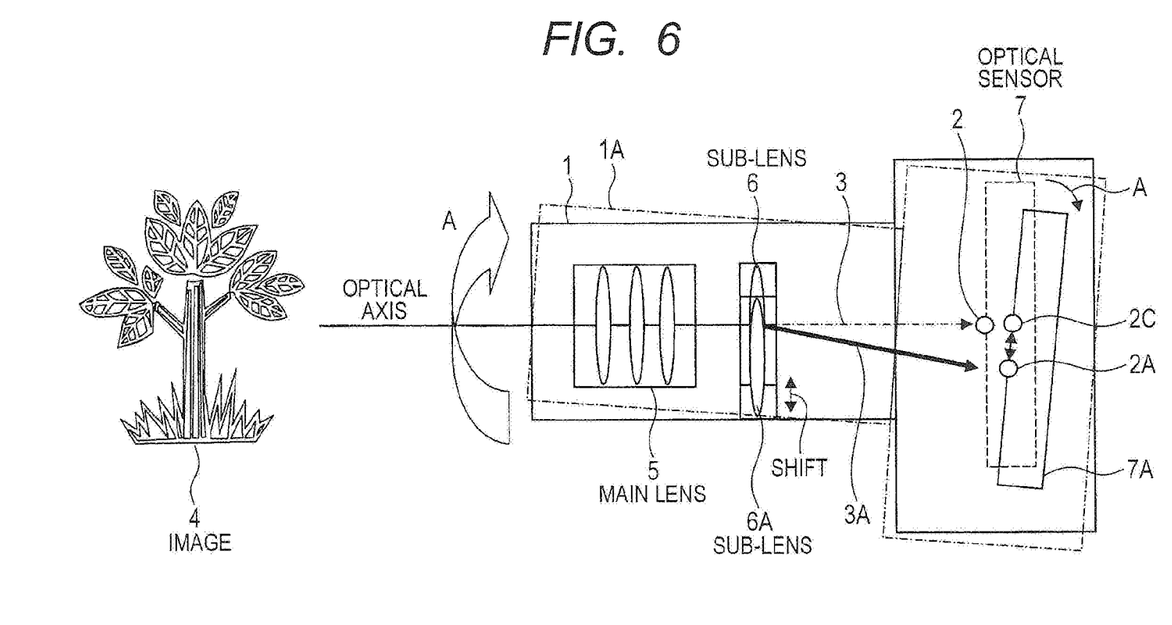
FIG. 6 is an explanatory diagram for explaining an outline of camera shake correction.

FIG. 6 is a schematic explanatory diagram for showing an outline of camera shake correction adopting a lens shift system. In FIG. 6, the reference numeral 1 denotes a housing of a camera (camera housing). In the camera housing 1, provided are a main lens 5, a sub-lens 6, and an optical sensor 7. In a state where the camera housing 1 is immobilized, an image 4 is imaged onto the optical sensor 7 through the main lens 5 and the sub-lens 6. In this case, an optical axis passing through the center of the main lens 5 is represented by the reference numeral 3, and is imaged onto a center position 2 of the optical sensor 7.

In the case where the camera housing 1 is swung in the direction represented by the arrow A in FIG. 6 due to a camera shake, the camera housing 1 is displaced to a state 1A represented by an alternate long and short dash line in FIG. 6. Along with this, the optical sensor 7 is also displaced to a position represented by the reference numeral 7A in FIG. 6. The optical axis 3 reaches a position 2C displaced from the center position of the optical sensor 7 without camera shake correction, and is imaged at the position 2C. On the contrary, the camera shake correction of the lens shift system shifts (moves) the position of the sub-lens 6, and the sub-lens 6 is displaced to a state 6A. In this example, the sub-lens 6 is shifted downward in FIG. 6. When the sub-lens 6 is shifted downward, light having reached the center of the sub-lens 6 reaches a peripheral position displaced from the center. The refractive index at the center of the sub-lens 6 is different from that at a peripheral position. Thus, the optical axis 3 is refracted as shown by the reference numeral 3A, and reaches a center position 2A of the optical sensor represented by the reference numeral 7A to be imaged onto the center position 2A.

Accordingly, if the camera housing 1 is swung due to a camera shake, the positions where the images are imaged can be the same. It should be noted that the camera having the main lens 5 and the sub-lens 6 has been described in FIG. 6, but only the sub-lens 6 may be provided without providing the main lens 5.

<Configuration of Camera Module>

Figure 1A:
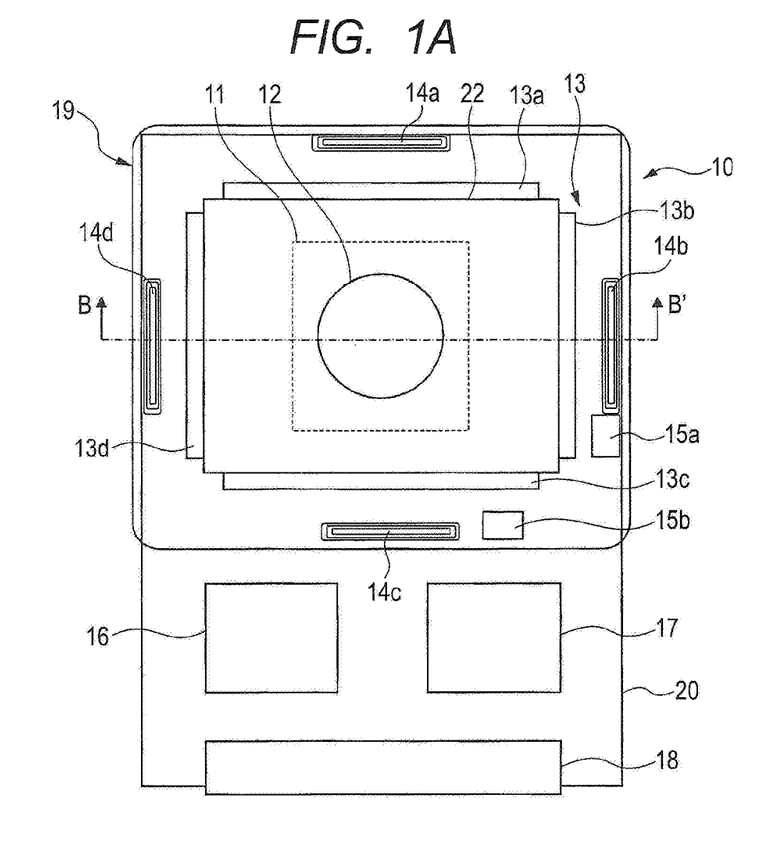
FIGS. 1A and 1B are a plan view and a cross-sectional view, respectively, each showing a schematic configuration of a camera module according to a first embodiment.
Figure 1B:
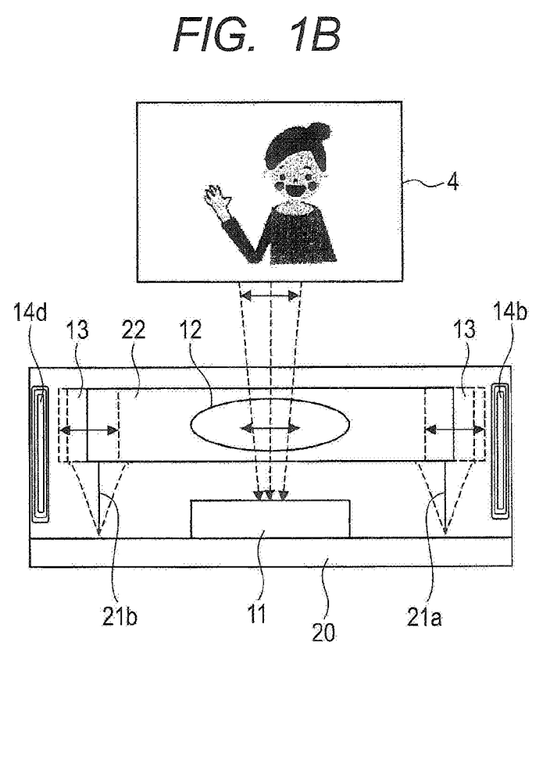

FIG. 1 are block diagrams each schematically showing a configuration of a camera module. FIG. 1A is a plan view of the camera module viewed in the direction where the optical sensor is viewed through the lens. Further, FIG. 1B is a cross-sectional view taken along the line B-B' in the plan view shown in FIG. 1A. Next, a configuration of a camera module 10 will be described using FIGS. 1A and 1B.

The camera module 10 includes a substrate 20, a housing 19, a gyro sensor 16, a semiconductor device 17, and a connector 18. The housing 19, the gyro sensor 16, the semiconductor device 17, and the connector 18 are mounted and integrated on the single substrate 20. The housing 19 includes an optical sensor 11, an optical image stabilizer (OIS) unit 22, magnets 13a to 13d, voice coil motors 14a to 14d, hole sensors 15a and 15b, and suspensions 21a and 21b for movably supporting the optical image stabilizer (OIS) unit 22.

The lens shift system is adopted in the first embodiment, and thus the optical sensor 11 is mounted and fixed on the substrate 20. On the other hand, the optical image stabilizer unit 22 has a lens 12, and is movably fixed to the substrate 20 through the suspensions 21a and 21b.

As shown in FIG. 1A, the magnets 13a to 13d are fixed and attached to the optical image stabilizer (OIS) unit 22 so as to surround the same. Applying a driving signal to the voice coil motors 14a to 14d generates magnetic fields in the voice coil motors 14a to 14d. Action and reaction between the magnetic fields generated in the voice coil motors 14a to 14d and those generated in the magnets 13a to 13d allow the optical image stabilizer (OIS) unit 22 to move in the vertical and horizontal directions in FIG. 1A. Specifically, applying a driving signal with a proper voltage to each of the voice coil motors 14a to 14d allows the optical image stabilizer (OIS) unit 22 to be able to arbitrarily move in the vertical and horizontal directions by an arbitrary distance. In FIG. 1B, areas where the optical image stabilizer (OIS) unit 22 and the magnets 13a to 13d are moved in the horizontal direction are shown using dashed lines.

Further, when the magnets 13a to 13d and the optical image stabilizer unit 22 are moved by the magnetic fields generated by the voice coil motors 14a to 14d, the hole sensors 15a and 15b provided in the housing 19 detect a change in the magnetic fields generated by the magnets 13b to 13c and output the amount of change.

When the camera module 10 is swung due to a camera shake and the position thereof is changed, the gyro sensor 16 outputs positional information representing the change of the position and sensitivity deviation information representing the deviation of the sensitivity of the gyro sensor 16.

In response to the positional information and the sensitivity deviation information from the gyro sensor 16 and outputs from the hole sensors 15a and 15b, the semiconductor device 17 supplies a driving signal to the voice coil motors 14a to 14d. The driving signal from the semiconductor device 17 controls the magnetic fields generated in the voice coil motors 14a to 14d. From the point of view of controlling the voice coil motors, the semiconductor device 17 can be regarded as a motor driving semiconductor device.

The optical image stabilizer (OIS) unit 22 has the lens 12 arranged parallel to the optical sensor 11. For example, as shown in FIG. 1B, the optical image stabilizer (OIS) unit 22 is moved in the horizontal direction by controlling the voice coil motors 14a to 14d with the driving signal from the semiconductor device 17. Accordingly, as shown by solid arrows in FIG. 1B, the lens 12 is also moved in the horizontal direction. Specifically, the lens 12 is moved in the horizontal direction while keeping the parallel state with the optical sensor 11. Accordingly, as described in FIG. 6, the position of the lens with which the optical axis is contacted is changed, and the refractive index relative to light is changed. Thus, the camera shake is corrected.

An image signal output from the optical sensor 11 is output outside the camera module 10 through the connector 18. Further, a signal controlling the semiconductor device 17 is supplied from the outside of the camera module 10 to the semiconductor device 17 through the connector 18. However, the present invention is not particularly limited to this. It should be noted that, for example, a so-called CMOS sensor is used as the optical sensor 11. It is obvious that the present invention is not limited to the CMOS sensor.

<Configuration of Gyro Sensor 16>

Figure 2:
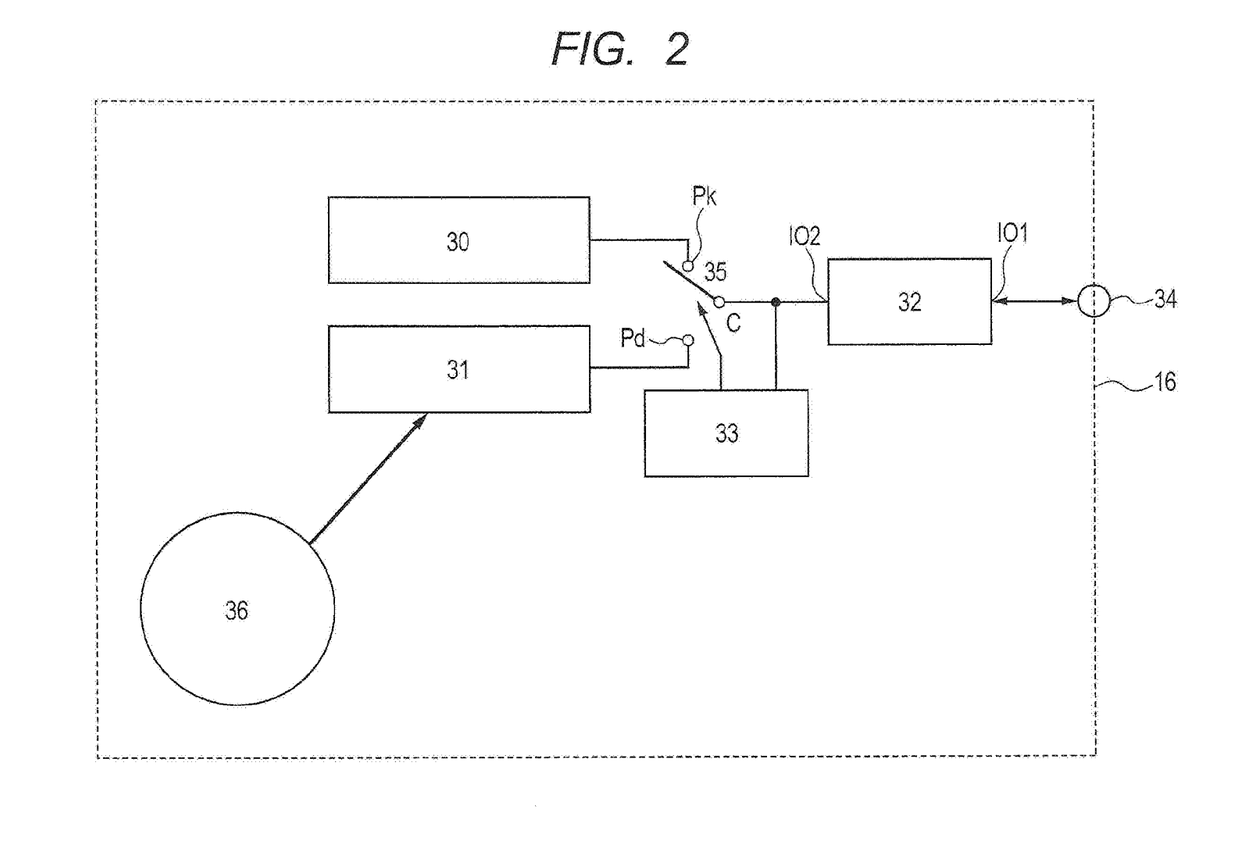
FIG. 2 is a block diagram for showing a configuration of a gyro sensor according to the first embodiment.

FIG. 2 is a block diagram for showing a configuration of the gyro sensor 16. The gyro sensor 16 has a plurality of external terminals. However, one external terminal 34 is illustrated in FIG. 2. The external terminal 34 is coupled to an external terminal of the semiconductor device 17, to be described later, on the substrate 20 (FIG. 1). The external terminal 34 is an input/output terminal for serial communications, and a first input/output terminal 101 of a serial communication circuit 32 is coupled to the external terminal 34.

The serial communication circuit 32 has the first input/output terminal 101 and a second input/output terminal 102, and the second input/output terminal 102 is coupled to a common terminal C of a switch 35 and a control circuit 33. The control circuit 33 couples the common terminal of the switch 35 to a first terminal Pk or a second terminal Pd in accordance with designation information supplied from the second input/output terminal 102. An output of a first register (first holding circuit) 30 is supplied to the first terminal Pk of the switch 35, and an output of a second register (second holding circuit) 31 is supplied to the second terminal Pd of the switch 35.

In FIG. 2, the reference numeral 36 denotes an angular velocity detection unit that outputs positional information in accordance with an angular velocity. The angular velocity detection unit 36 has, for example, an analog-to-digital conversion circuit, and outputs positional information of a digital value. The positional information from the angular velocity detection unit 36 is stored in the second register 31. Further, as will be described later using FIG. 4, when the sensitivity deviation of the gyro sensor 16 is calibrated in a gyro sensor manufacturing process, the sensitivity deviation information representing the corrected sensitivity deviation is stored (memorized) in the first register 30.

When instruction information instructing the register from the semiconductor device 17 is supplied through the external terminal 34, the serial communication circuit 32 supplies the instruction information to the control circuit 33. The control circuit 33 controls the switch 35 in accordance with the supplied instruction information. Specifically, when the instruction information instructing to output the positional information is supplied from the semiconductor device 17 to the control circuit 33 through the external terminal 34 and the serial communication circuit 32, the control circuit 33 couples the common terminal C of the switch 35 to the second terminal Pd. Accordingly, the positional information stored in the second register 31 is supplied to the second input/output terminal 102 of the serial communication circuit 32 through the switch 35. The serial communication circuit 32 supplies the positional information supplied to the second input/output terminal 102 to the semiconductor device 17 as serial data through the external terminal 34.

On the other hand, when the instruction information instructing to output the sensitivity deviation information is supplied from the semiconductor device 17 to the control circuit 33 through the external terminal 34 and the serial communication circuit 32, the control circuit 33 couples the common terminal C of the switch 35 to the first terminal Pk. Accordingly, the sensitivity deviation information of the gyro sensor 16 stored in the first register 30 is supplied to the second input/output terminal 102 of the serial communication circuit 32 through the switch 35. The serial communication circuit 32 supplies the sensitivity deviation information supplied to the second input/output terminal 102 to the semiconductor device 17 as serial data through the external terminal 34.

Address information can be used as the designation information output from the semiconductor device 17. In this case, for example, a first address is assigned to the first register 30, and a second address different from the first address is assigned to the second register 31. The control circuit 33 determines whether the address information that is the designation information designates the first address or the second address. Accordingly, the control circuit 33 supplies the sensitivity deviation information stored in the first register 30 or the positional information stored in the second register 31 to the second input/output terminal 102 of the serial communication circuit 32 in accordance with the address information.

Accordingly, the gyro sensor 16 can output the positional information and the sensitivity deviation information from the external terminal 34 in a time-division manner. In this case, the number of external terminals of the gyro sensor 16 can be suppressed from being increased, and the cost of the gyro sensor 16 can be suppressed from being increased.

It should be noted that the first and second registers 30 and 31 are exemplified in FIG. 2, but the present invention is not limited to the number. Specifically, the gyro sensor 16 may have a register other than the second register 31 storing the positional information and the first register 30 storing the sensitivity deviation information.

<Configuration of Semiconductor Device 17>

Figure 3:
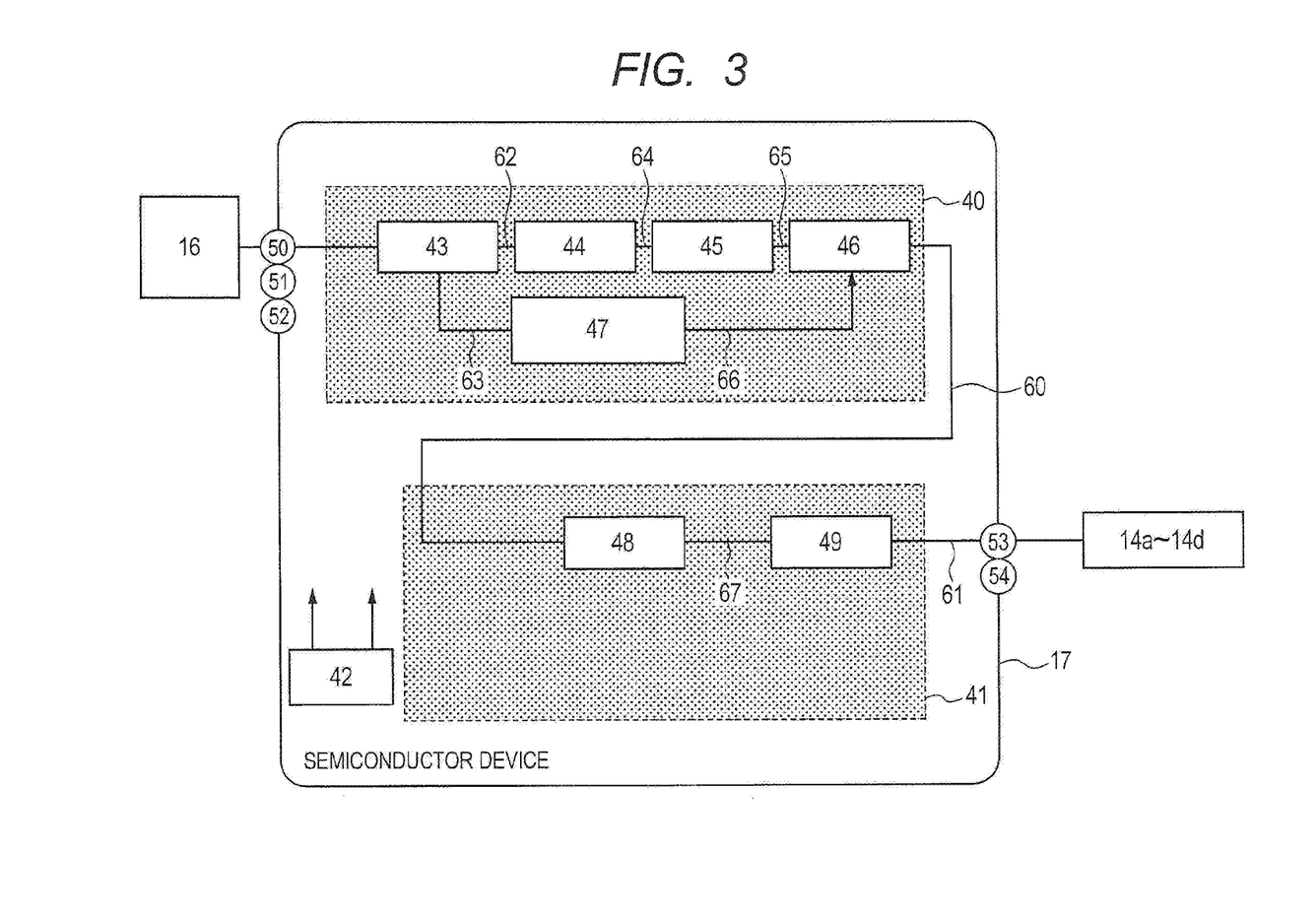
FIG. 3 is a block diagram for showing a configuration of a semiconductor device according to the first embodiment.

FIG. 3 is a block diagram for showing a configuration of the semiconductor device 17. The semiconductor device 17 is a motor driving semiconductor device that controls the voice coil motors 14a to 14d in response to the positional information and the sensitivity deviation information from the gyro sensor 16. Specifically, the semiconductor device 17 includes a gyro signal processing unit 40 that outputs gyro positional information 60 in response to the positional information and the sensitivity deviation information from the gyro sensor 16, a driver signal processing unit (processing unit) 41 that outputs a motor control signal (driving signal) 61 in response to the gyro positional information 60 from the gyro signal processing unit 40, and a microcontroller (hereinafter, referred to as MCU) 42 that controls the gyro signal processing unit 40 and the driver signal processing unit 41. The gyro signal processing unit (hereinafter, referred to as G processing unit) 40, the driver signal processing unit (hereinafter, referred to as D processing unit) 41, and the MCU 42 are formed on one semiconductor chip substrate in a well-known semiconductor manufacturing technique. However, the present invention is not particularly limited to this.

The semiconductor device 17 is provided with a plurality of external terminals. However, external terminals 50 to 54 among those are illustrated in FIG. 3. Of these external terminals 50 to 54, in particular, the external terminal 50 is an external terminal that couples the gyro sensor 16 to the semiconductor device 17, and the external terminal 53 is an external terminal that couples the voice coil motors 14a to 14d to the semiconductor device 17.

The external terminal 50 is electrically coupled to the external terminal 34 of the gyro sensor 16 shown in FIG. 2. The external terminal 50 is an input/output terminal for serial communications. The semiconductor device 17 serially supplies the designation information to the external terminal 34 of the gyro sensor 16 through the external terminal 50, and serially receives the positional information and the sensitivity deviation information from the external terminal 34 of the gyro sensor 16. In FIG. 2 and FIG. 3, each of the external terminals 34 and 50 is illustrated as one external terminal. However, it is to be understood that each of the external terminals 34 and 50 includes a plurality of external terminals. Specifically, the external terminal 34 has an input terminal that serially receives the designation information output from the semiconductor device 17, and one (common) output terminal that serially transmits the positional information and the sensitivity deviation information to the semiconductor device 17 in a time-division manner. Further, the external terminal 50 has an output terminal that serially outputs the designation information to the gyro sensor 16, and one (common) input terminal that serially receives the positional information and the sensitivity deviation information from the gyro sensor 16 in a time-division manner.

Each of the external terminals 34 and 50 may have an external terminal for a synchronizing clock signal other than the input terminal and the output terminal. In this case, the semiconductor device 17 has an output terminal that outputs a synchronizing clock signal, and the gyro sensor 16 has an input terminal that receives the synchronizing clock signal. In synchronization with the synchronizing clock signal, the designation information is serially supplied to the gyro sensor 16 from the semiconductor device 17. On the other hand, the gyro sensor 16 serially supplies the positional information and the sensitivity deviation information to the semiconductor device 17 in synchronization with the supplied synchronizing clock signal.

It is to be understood that the external terminal 53 also has a plurality of external terminals. Specifically, the external terminal 53 has four external terminals associated with the voice coil motors 14a to 14d, and the motor control signal (driving signal) 61 is output from each of the external terminals to the corresponding voice coil motor.

The G processing unit 40 includes a serial communication circuit 43, a filter circuit 44, a first gain control amplifier 45, a second gain control amplifier 46, and a holding circuit 47. In this case, the holding circuit 47 is a holding circuit (second holding circuit) that holds the sensitivity deviation information, and is configured using, for example, a register.

The serial communication circuit 43 is controlled by the MCU 42. When the positional information is supplied to the external terminal 50, the serial communication circuit 43 supplies the supplied positional information 62 to the filter circuit 44. When the sensitivity deviation information is supplied to the external terminal 50, the serial communication circuit 43 supplies the supplied sensitivity deviation information 63 to the holding circuit 47. Further, the serial communication circuit 43 receives the designation information from the MCU 42, and outputs the same to the external terminal 50.

Under the control of the MCU 42, for example, the serial communication circuit 43 first outputs the first address designating the first register 30 (FIG. 2) to the external terminal 50 as the designation information from the MCU 42. When the control circuit 33 (FIG. 2) receives the designation information designating the first address through the serial communication circuit 32 (FIG. 2) in the gyro sensor 16, the control circuit 33 controls the switch 35 to supply the sensitivity deviation information stored in the first register 30 to the serial communication circuit 32 (FIG. 2). Accordingly, the serial communication circuit 32 outputs the supplied sensitivity deviation information from the external terminal 34 (FIG. 2). The MCU 42 outputs the designation information designating the first register 30, and then controls the serial communication circuit 43 to supply the serial information supplied to the external terminal 50 to the holding circuit 47 on the assumption that the information supplied to the external terminal 50 is the sensitivity deviation information. Accordingly, the sensitivity deviation information output from the gyro sensor 16 is supplied to the holding circuit 47 as the sensitivity deviation information 63, and the sensitivity deviation information 63 is held in the holding circuit 47.

Next, the MCU 42 controls the serial communication circuit 43 to output the second address designating the second register 31 (FIG. 2) as the designation information from the external terminal 50. Accordingly, the designation information designating the second register 31 is supplied from the serial communication circuit 43 to the serial communication circuit 32 (FIG. 2) in the gyro sensor 16 through the external terminals 50 and 34 (FIG. 2). When the designation information designating the second register 31 is supplied from the serial communication circuit 32 to the control circuit 33, the control circuit 33 controls the switch 35 to supply the positional information stored in the second register 31 to the serial communication circuit 32. As a result, the serial communication circuit 32 supplies the supplied positional information to the external terminal 50 through the external terminal 34. Accordingly, the positional information is supplied to the serial communication circuit 43. On the other hand, the MCU 42 outputs the designation information designating the second register 31, and then controls the serial communication circuit 43 to supply the information supplied to the external terminal 50 to the filter circuit 44 on the assumption that the information supplied to the external terminal 50 is the positional information. Accordingly, the positional information output from the gyro sensor 16 is supplied to the filter circuit 44 through the serial communication circuit 43.

The control circuit 33 controls the switch 35 to supply positional information stored in the second register 31 to the serial communication circuit 32 in the gyro sensor 16 until the designation information designating the first register 30 is supplied again. However, the present invention is not particularly limited to this. The positional information is periodically supplied from the angular velocity detection unit 36 to the second register 31, and the updated positional information is stored in the second register 31. As a result, the updated positional information is continuously output from the gyro sensor 16 until the designation information designating the first register 30 is supplied next. The MCU 42 controls the serial communication circuit 43 to supply the positional information 62 from the serial communication circuit 43 to the filter circuit 44 even in the semiconductor device 17 on the assumption that the information periodically supplied to the external terminal 50 is the positional information. Accordingly, the positional information from the gyro sensor 16 is continuously supplied to the filter circuit 44 as the positional information 62.

The filter circuit 44 functions to remove noise contained in the supplied positional information 62. The positional information 64 with the noise removed is supplied to the first gain control amplifier 45 to be amplified. The positional information 65 amplified by the first gain control amplifier 45 is amplified by the second gain control amplifier 46, and is supplied to the D processing unit 41 as the gyro positional information 60.

In this case, the gain of the second gain control amplifier 46 is set on the basis of the sensitivity deviation information 66 stored in the holding circuit 47. As described above, the holding circuit 47 stores the sensitivity deviation information 63 supplied from the gyro sensor 16, and supplies the stored sensitivity deviation information to the second gain control amplifier 46 as the sensitivity deviation information 66. On the basis of the sensitivity deviation information 66, the gain of the second gain control amplifier 46 is set. On the other hand, a reference gain that is common among a plurality of gyro sensors 16 is set for the first gain control amplifier 45.

The sensitivity of the angular velocity detection unit 36 in the gyro sensor 16 varies depending on the gyro sensor 16. Specifically, in the case of a plurality of gyro sensors 16, the sensitivity differs depending on the gyro sensor 16. Therefore, the sensitivity deviation of each gyro sensor 16 is calibrated in the gyro sensor manufacturing process, and the sensitivity of each gyro sensor 16 is corrected so as to fall within a predetermined range. For example, a reference sensitivity (predetermined sensitivity) is set for a plurality of gyro sensors 16, and higher and lower ranges of the sensitivity relative to the reference sensitivity are set. Then, the sensitivity of each gyro sensor 16 is corrected so as to fall within a range (predetermined range) between the higher and lower ranges of the sensitivity. For example, while the reference sensitivity is set at 0, the sensitivity of each gyro sensor 16 is corrected so as to fall within a range between +3% and −3% in the gyro sensor manufacturing process. In other words, the sensitivity of each gyro sensor 16 is corrected so as to fall within a range of ±3%.

In the gyro sensor manufacturing process, the sensitivity of each gyro sensor 16 is corrected to fall within a predetermined range, the difference of the sensitivity relative to the reference sensitivity, namely, the deviation of the sensitivity (sensitivity deviation) is obtained, and the information (sensitivity deviation information) of the obtained sensitivity deviation is stored in the first register 30 to be provided. For example, in the case where the gyro sensor 16 is corrected and the sensitivity thereof is deviated by +2% relative to the reference sensitivity, the sensitivity deviation information of +2% is stored in the first register 30 in the gyro sensor manufacturing process to provide the gyro sensor 16. As similar to the above, if the sensitivity is deviated by −1% relative to the reference sensitivity, the sensitivity deviation information of −1% is stored in the first register 30 to provide the gyro sensor 16.

Thus, the gain of the second gain control amplifier 46 is set in accordance with the value of the sensitivity deviation relative to the reference sensitivity. In this case, the gain of the second gain control amplifier 46 is set to be decreased for the deviation of the sensitivity that becomes higher relative to the reference sensitivity. On the other hand, the gain of the second gain control amplifier 46 is set to be increased for the deviation of the sensitivity that becomes lower relative to the reference sensitivity. In the case of the sensitivity deviation information 66 of +2% in the above-described example, the gain of the second gain control amplifier 46 is set to be decreased by, for example, 2%. On the contrary, in the case of the sensitivity deviation information 66 of −1%, the gain of the second gain control amplifier 46 is set to be increased by, for example, 1%. In the case of the sensitivity deviation information 66 of 0%, the gain of the second gain control amplifier 46 is set at 1, and the second gain control amplifier 46 does not amplify. However, the present invention is not particularly limited to this.

The setting of the gain of the first gain control amplifier 45 will be described following the description of the D processing unit 41.

The D processing unit 41 includes a PID (Proportional-Integral Derivative) controller unit 48 and a driver circuit 49. The PID controller unit 48 compares the position represented by the gyro positional information 60 with that of the optical image stabilizer (OIS) unit 22 (FIG. 1), and forms a driving control signal 67 that allows the position of the optical image stabilizer (OIS) unit 22 and that represented by the gyro positional information 60 to match each other. The driver circuit 49 forms the motor control signal (driving signal) 61 that drives the voice coil motors 14a to 14d on the basis of the driving control signal 67, and supplies the same to the voice coil motors 14a to 14d through the external terminal 53.

The setting of the gain of the first gain control amplifier 45 will be described below. As described above, as the gain of the first gain control amplifier 45, the common reference gain is set for the gyro sensors 16. The gain set for the second gain control amplifier 46 is associated with the sensitivity deviation information. Therefore, the reference gain set for the first gain control amplifier 45 can be regarded to be associated with the reference sensitivity used when the sensitivity deviation is set.

The reference gain is set at a value at which an image captured by the camera module 10 (FIG. 1) is immobilized when the camera module 10 having one of the gyro sensors 16 with the reference sensitivity mounted is swung. For example, the camera module 10 having the reference gyro sensor 16 mounted is physically swung while changing the gain of the first gain control amplifier 45. When the camera module 10 is swung, the captured image also blurs due to the characteristics of the camera module 10 except the gyro sensor 16. In this case, the characteristics of the camera module 10 are set on the basis of the characteristics of, for example, the filter circuit 44, the driver circuit 49, and the PID controller unit 48 included in the semiconductor device 17. The value of the gain of the first gain control amplifier 45 is obtained so as to immobilize the captured image even when the camera module 10 is swung. Accordingly, the reference gain with the characteristics of the camera module 10 reflected can be obtained. In other words, the reference gain is a gain associated with the sensitivity with the characteristics of the camera module 10 reflected, and can be regarded as the reference gain common to a plurality of camera modules 10.

It should be noted that when the gain of the first gain control amplifier 45 is obtained, it is desirable to prevent amplification and attenuation in the second gain control amplifier 46 while setting the gain of the second gain control amplifier 46 at 1.

In the first embodiment, an output of the first gain control amplifier 45 is supplied to an input of the second gain control amplifier 46. Therefore, an operation (product) between the reference gain set for the first gain control amplifier 45 and the gain on the basis of the sensitivity deviation information set for the second gain control amplifier 46 corresponds to an amplification factor for the positional information 64. The reference gain is represented by a reference gain parameter common to the camera modules 10 or the gyro sensors 16. Therefore, the amplification factor in each camera module can be regarded to be set by an operation between the reference gain parameter and the gain associated with the sensitivity deviation information unique to the gyro sensor to be mounted.

In the example of FIG. 3, the external terminal 50 is used as a common external terminal that receives the positional information and the sensitivity deviation information in a time-division manner. However, external terminals that are different from each other may be provided in the semiconductor device 17. Specifically, a first external terminal that receives the positional information and a second external terminal that receives the sensitivity deviation information may be provided.

<Correction Method of Camera Module>

Figure 4:
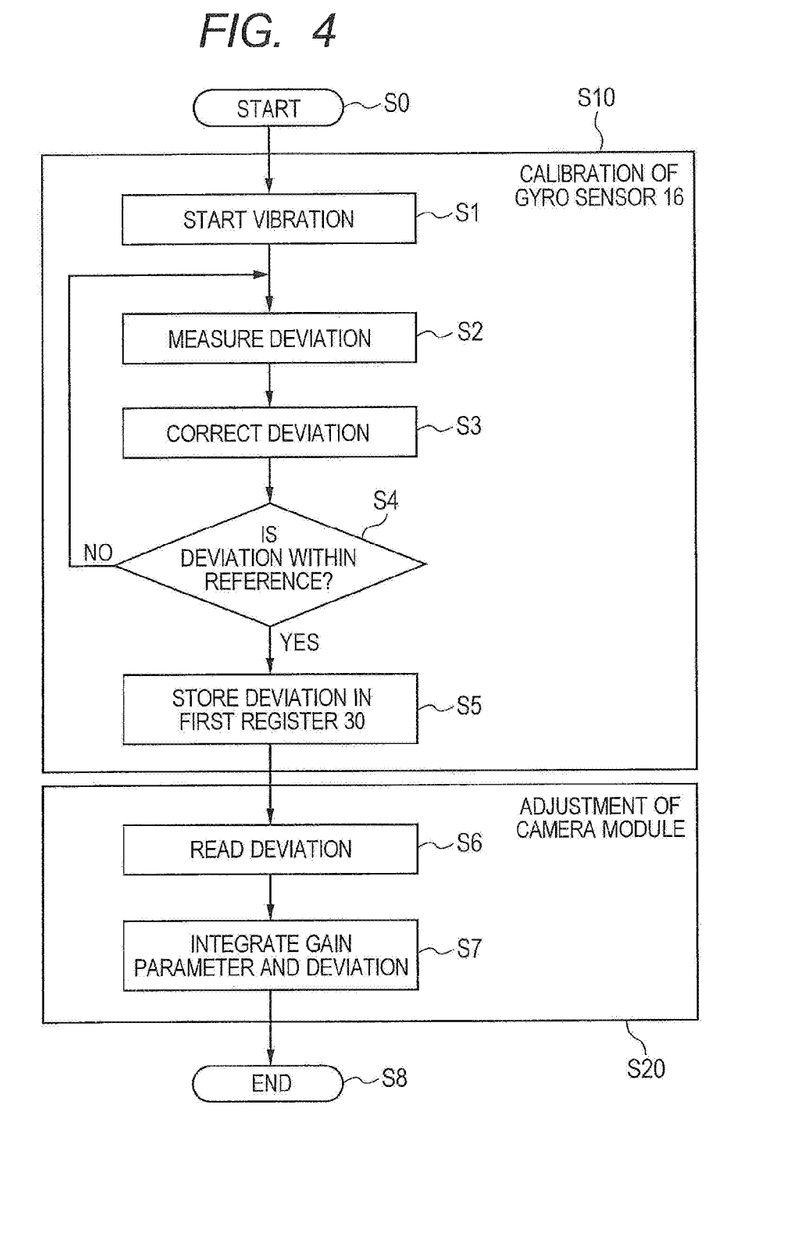
FIG. 4 is a flowchart for showing a correction method of a camera module according to the first embodiment.

FIG. 4 is a flowchart for showing a correction method of a camera module. FIG. 4 shows steps performed in a gyro sensor manufacturing process and steps performed in a module assembly process in which the provided gyro sensor 16 is mounted in the camera module 10. Specifically, Step S10 (calibration of the gyro sensor 16) shows steps performed in the gyro sensor manufacturing process, and Step S20 (adjustment of the camera module) shows steps performed in the module assembly process. It is obvious that it is not necessary to continuously perform Step S10 and Step S20. Next, the correction method will be described using FIG. 1 to FIG. 4.

First, the correction is started in Step S0. In Step S1, the gyro sensor 16 shown in FIG. 2 is started to be physically vibrated. In Step S2, the deviation of the sensitivity of the positional information output from the angular velocity detection unit 36 is measured. Since the deviation of the sensitivity does not fall within a predetermined range (±3%), the angular velocity detection unit 36 is adjusted to correct the deviation of the sensitivity of the positional information output from the angular velocity detection unit 36 in Step S3.

Next, in Step S4, the value of the deviation of the positional information corrected in Step S3 is obtained to determine whether or not the value falls within the predetermined range (in the flowchart, described as "is deviation within reference?"). If the value does not fall within the predetermined range, Steps S2 to S4 are executed until the value falls within the predetermined range. On the other hand, it is determined in Step S4 that the value falls within the predetermined range, the value of the deviation obtained in Step S4 is stored in the first register (first holding circuit) 30 as correction information (Step S5). It should be noted that the physical vibration of the gyro sensor 16 is continued until the value of the deviation falls within the predetermined range in Step S4. However, the present invention is not particularly limited to this.

Steps S1 to S5 are performed for each gyro sensor 16, and thus the sensitivity deviation information (correction information) on the basis of the sensitivity deviation of the positional information is stored in the first register 30 of each gyro sensor 16. In FIG. 4, Steps S1 to S4 can be regarded as a correction process (first correction process), and Step S5 can be regarded as a storing process (first storing process).

Next, although not shown in FIG. 4, the gyro sensor 16 is mounted in the camera module 10 in a preparation process as shown in FIG. 1. In the camera module 10 having the gyro sensor 16 mounted, the semiconductor device 17 performs the following steps. In this case, the MCU 42 (FIG. 3) in the semiconductor device 17 performs the following steps in accordance with a program (not shown).

First, the MCU 42 serially supplies the designation information designating the first register 30 from the semiconductor device 17 to the gyro sensor 16. Accordingly, the gyro sensor 16 serially supplies the sensitivity deviation information (correction information) stored in the first register 30 to the semiconductor device 17 (outputting process). The serial communication circuit 43 in the semiconductor device 17 reads the supplied sensitivity deviation information (correction information), and supplies the same to the holding circuit 47 to store the sensitivity deviation information (correction information) 63 in the holding circuit 47 (Step S6: reading process).

The sensitivity deviation information (correction information) 66 stored in the holding circuit 47 is supplied to the second gain control amplifier 46. The gain of the second gain control amplifier 46 is set on the basis of the sensitivity deviation information (correction information) 66. In this case, the gain of the first gain control amplifier 45 is set in advance on the basis of the reference gain parameter. As a result, the gain parameter and the sensitivity deviation information (correction information) are integrated by the first gain control amplifier 45 and the second gain control amplifier 46 (Step S7: second correction process).

It should be noted that, as described above, the reference gain parameter is obtained in advance by physically swinging the camera module 10 having the reference gyro sensor 16 mounted, and is stored in each semiconductor device 17 before Step S6. For example, an electrically rewritable non-volatile memory is provided in the first gain control amplifier 45, and the preliminarily-obtained reference gain parameter is written. Accordingly, an operation between the reference gain parameter and the sensitivity deviation information (correction information) can be performed in Step S7 (operation process).

As described above, the reference gain parameter is stored in advance in the semiconductor device 17, but the present invention is not limited to this. For example, the reference gain parameter may be supplied to and set for the first gain control amplifier 45 in Step S6 or S7.

Further, a total parameter holding circuit is provided in the semiconductor device 17, and an operation between the reference gain parameter and the sensitivity deviation information (correction information) read in Step S6 is performed to obtain a total gain parameter which may be stored in the total parameter holding circuit provided in the semiconductor device 17. The operation may be performed in the operation process in Step S7, and the total gain parameter may be stored in the total gain parameter holding circuit in a second storing process provided between, for example, Step S7 and Step S8. In this case, the first gain control amplifier 45 and the second gain control amplifier 46 may be configured using one gain control amplifier to set the gain of the one gain control amplifier on the basis of the total gain parameter held in the total parameter holding circuit.

The total parameter holding circuit is configured using an electrically rewritable non-volatile memory. Accordingly, if the gain of the gain control amplifier is set on the basis of the total gain parameter from the total parameter holding circuit even when the power of the camera module 10 is turned on again after the power of the camera module 10 is turned off, a gain in accordance with the sensitivity of the gyro sensor mounted in the camera module can be set for the gain control amplifier.

Figure 7:
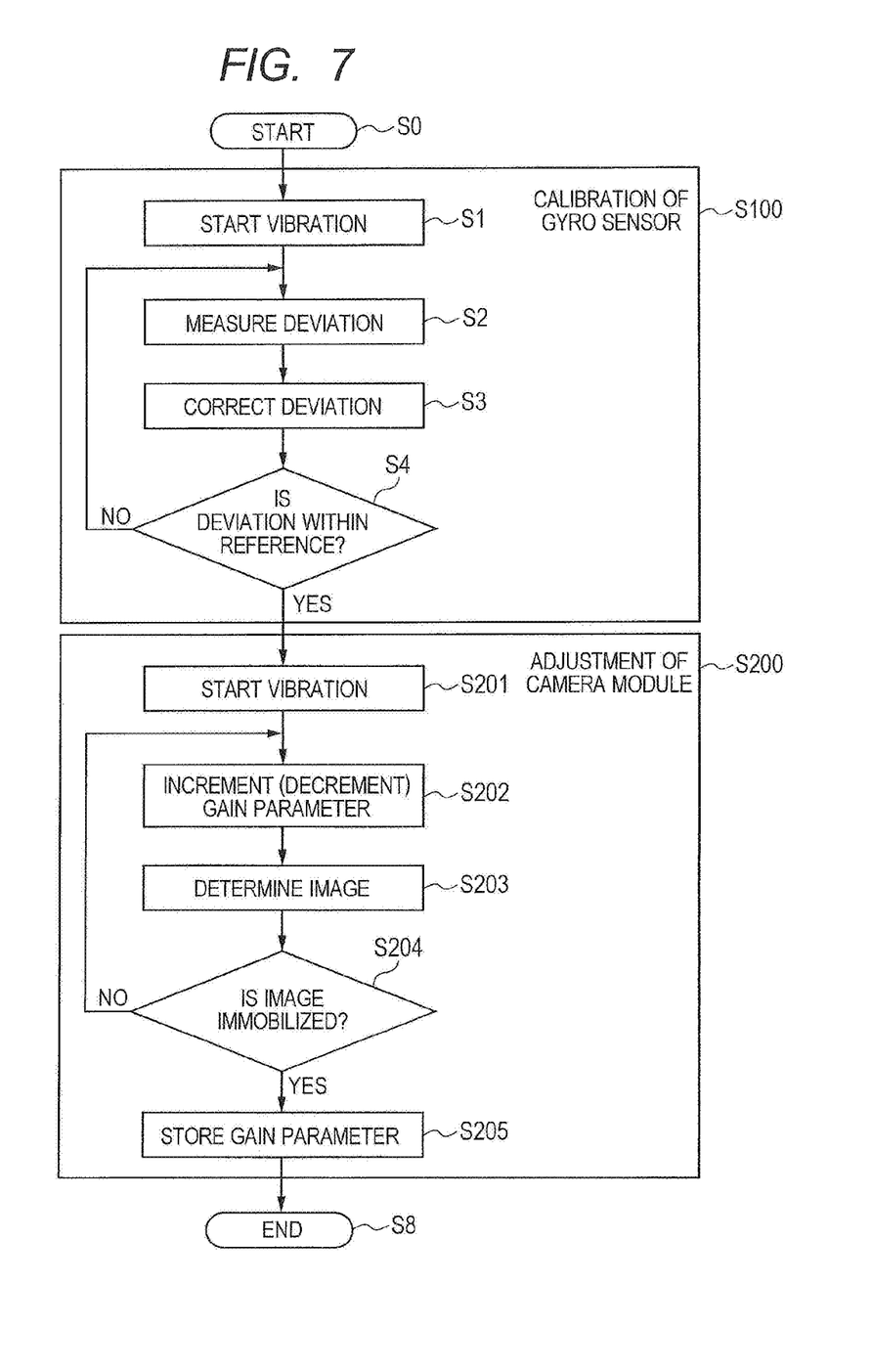
FIG. 7 is a flowchart for showing a correction method examined prior to the present invention.

There is also a correction method of the camera module as shown in FIG. 7. In the correction method shown in FIG. 7, the correction is performed in Step S100 (calibration of the gyro sensor) and Step S200 (adjustment of the camera module). In Step S100, steps similar to Steps S1 to S4 shown in FIG. 4 are performed. Specifically, the gyro sensor is started to be vibrated in Step S1, the deviation is measured in Step S2, and the deviation is corrected in Step S3. It is determined in Step S4 whether or not the deviation falls within the reference, and Steps S2 to S4 are repeated until the deviation falls within the reference. When it is determined in Step S4 that the deviation falls within the reference, the gyro sensor manufacturing process is finished, and the gyro sensor is provided. In this case, Steps S2 to S3 are repeated until the deviation falls within the reference in Step S4. Accordingly, the sensitivity of each gyro sensor provided from the gyro sensor manufacturing process falls within the predetermined range.

Next, the gyro sensor is mounted in the camera module, and the camera module is adjusted in Step S200. Specifically, the camera module having the gyro sensor mounted is started to be vibrated in Step S201. In Step S202, the gain parameter of the semiconductor device that receives an output from the gyro sensor is incremented or decremented. Next, an image is determined in a state where the gain parameter is incremented (or decremented) in Step S203. It is determined in Step S204 whether or not the image from the vibrating camera module is immobilized. If the image is not immobilized (No), Steps S202 to S204 are repeatedly executed until it is determined (Yes) that the image is immobilized. The gain parameter when it is determined that the image is immobilized is stored in the semiconductor device in Step S205, and the correction is finished (Step S8).

In the first embodiment, the sensitivity can be corrected in accordance with each gyro sensor 16 without physically vibrating each camera module, as compared to the correction method described using FIG. 7. As a result, the cost of the camera module can be prevented from being increased while preventing the swing suppression ratio from being deteriorated. Specifically, facilities and processes to physically vibrate (swing) the respective camera modules can be reduced, and thus the cost can be suppressed from being increased.

Further, the information of the sensitivity deviation may be stored in the first register 30 without performing Steps S1 to S4 performed in the gyro sensor manufacturing process, namely, the steps in which the sensitivity is allowed to fall within the predetermined range. In this case, a gain in accordance with the sensitivity of each gyro sensor 16 can be set in Steps S6 and S7 of FIG. 4, and further the cost can be suppressed. Further, in this case, it is not necessary to vibrate the gyro sensor in the gyro sensor manufacturing process, and thus facilities and processes to physically vibrate the respective gyro sensors can be reduced Here, a correction operation in the semiconductor device 17 will be described with reference to FIG. 4. In Step S6, the sensitivity deviation information is serially read from the gyro sensor 16 (sensitivity deviation information reading process). On the basis of the sensitivity deviation information read in the reading process (Step S6), each gain of the gain control amplifiers (first and second gain control amplifiers 45 and 45) when the positional information is amplified is set in Step S7 (correction process).

The MCU 42 in the semiconductor device 17 supplies the designation information designating the second register 31 to the gyro sensor 16 using the serial communication circuit 43. In response to the designation information, not the sensitivity deviation information but the positional information is serially supplied from the gyro sensor 16 to the external terminal 50 of the semiconductor device 17. The semiconductor device 17 reads the positional information (positional information reading process). The read positional information is amplified by the gain control amplifier having the gain set in the correction process, and is supplied to the D processing unit as the gyro positional information 60.

It should be noted that an operation between the reference gain parameter and the sensitivity deviation information is performed in the correction process, and the gain of the gain control amplifier is set in accordance with the value obtained by the operation.

Second Embodiment

Figure 5:
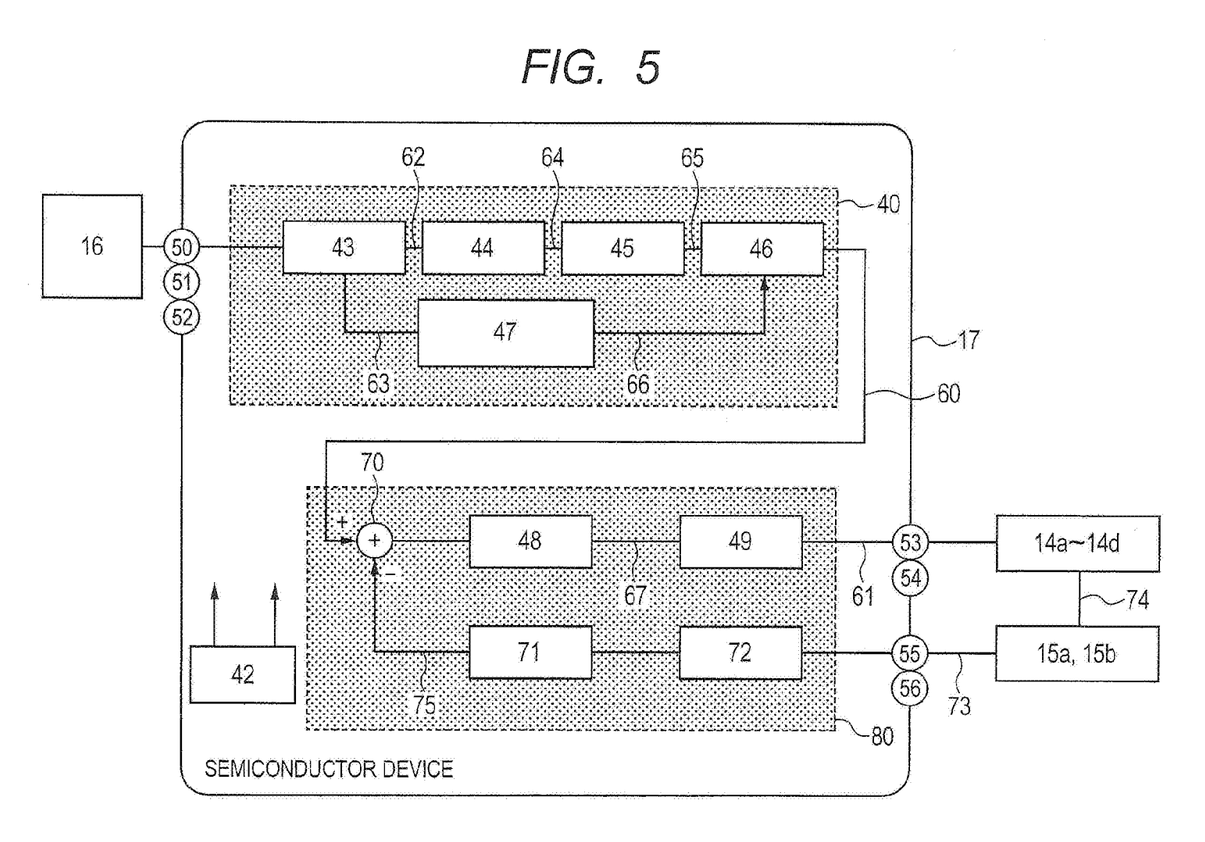
FIG. 5 is a block diagram for showing a configuration of a semiconductor device according to a second embodiment.

FIG. 5 is a block diagram for showing a configuration of a semiconductor device 17 according to a second embodiment. The configuration of the semiconductor device 17 shown in FIG. 5 is similar to that shown in FIG. 3. Therefore, only different features will be mainly described below.

In the second embodiment, the hole sensors 15a and 15b shown in FIG. 1 are used to control the position of the optical image stabilizer unit 22 (FIG. 1). Because the hole sensors 15a and 15b are used, a camera module 10 shown in FIG. 5 has a D processing unit 80 that is different from that of the camera module shown in FIG. 3. It should be noted that the same reference numerals are given to the same constitutional elements in FIG. 3 and FIG. 5, and the explanation for the same constitutional elements will be omitted. The D processing unit 80 includes a PID control unit 48, a driver circuit 49, a subtraction circuit 70, an analog-to-digital conversion circuit 71, and a hole amplifier 72.

In FIG. 5, the reference numeral 74 denotes magnetic field coupling between magnets 13b to 13c moved by voice coil motors 14a to 14d and the hole sensors 15a and 15b. When the optical image stabilizer unit 22 having the magnets 13a to 13d mounted is moved by the magnetic field generated from the voice coil motors 14a to 14d, the hole sensors 15a and 15b output hole positional information 73 due to a change in the magnetic field. The hole positional information 73 is supplied to the hole amplifier 72 through an external terminal 55 of a semiconductor device 17. The hole amplifier 72 amplifies the hole positional information 73 that is an analog signal, and supplies the same to the analog-to-digital conversion circuit 71. The analog-to-digital conversion circuit 71 converts the hole positional information 73 into hole positional information 75 of a digital signal to be supplied to the subtraction circuit 70. The subtraction circuit 70 performs a digital subtraction between the gyro positional information from a G processing unit 40 and the hole positional information 75, and supplies the result to the PID control unit 48. It should be noted that the reference numeral 56 denotes an external terminal of the semiconductor device 17 in FIG. 5.

In the second embodiment, the position of the optical image stabilizer unit 22 is recognized by the hole sensors 15a and 15b, and is reflected on gyro positional information 60. Accordingly, the optical image stabilizer unit 22 can be moved to a desired position in a shorter time.

In the first and second embodiments, the MCU 42 is provided in the semiconductor device 17, and the G processing unit 40 and the D processing units 41 and 80 are controlled by the MCU 42. However, the present invention is not limited to this. Specifically, a logic circuit including a sequential circuit may be used instead of the MCU 42. Further, a control circuit 33 provided in a gyro sensor 16 may be configured using the MCU.

Further, the D processing unit 80 has a function of processing signals of the hole sensors in the second embodiment, and thus may be regarded as a hole sensor processing unit.

<Supplementary Note>

A plurality of inventions is disclosed in the specification, and some are described in Claims. However, the inventions other than those are also disclosed, and the representative one will be described below.

(A) A gyro sensor comprising:

a first register that stores angular velocity information;

a second register that stores sensitivity deviation information of the angular velocity information stored in the first register;

a serial communication circuit; and a control circuit that selects the first register or the second register in accordance with designation information supplied through the serial communication circuit, wherein when the first register is selected by the control circuit, the angular velocity information stored in the first register is output through the serial communication circuit, and when the second register is selected by the control circuit, the sensitivity deviation information stored in the second register is output through the serial communication circuit.

(B) The gyro sensor according to (A), wherein the sensitivity deviation information is a deviation between a predetermined sensitivity and the sensitivity of the angular velocity information.

The invention made by the inventors has been concretely described above on the basis of the embodiments. However, it is obvious that the present invention is not limited to the embodiments, but can be variously changed without departing from the scope of the invention.

What is claimed is:

1. A gyro sensor comprising:

a first register that stores angular velocity information;

a second register that stores sensitivity deviation information of the angular velocity information stored in the first register;

a serial communication circuit; and a control circuit that selects the first register or the second register in accordance with designation information supplied through the serial communication circuit, wherein when the first register is selected by the control circuit, the angular velocity information stored in the first register is output through the serial communication circuit, and when the second register is selected by the control circuit, the sensitivity deviation information stored in the second register is output through the serial communication circuit.

2. The gyro sensor according to claim 1, wherein the sensitivity deviation information is a deviation between a predetermined sensitivity and the sensitivity of the angular velocity information.

3. A gyro sensor comprising:

a first register that stores velocity information;

a second register that stores sensitivity deviation information of the velocity information stored in the first register;

a communication circuit; and a control circuit that selects the first register or the second register in accordance with designation information supplied through the communication circuit, wherein when the first register is selected by the control circuit, the velocity information stored in the first register is output through the communication circuit, and when the second register is selected by the control circuit, the sensitivity deviation information stored in the second register is output through the communication circuit.

4. The gyro sensor according to claim 3, wherein the sensitivity deviation information comprises a deviation between a predetermined sensitivity and the sensitivity of the velocity information.

* * * * *